A. L. WYMAN.
CONNECTING ROD.
APPLICATION FILED DEC. 1, 1911.

1,043,495.

Patented Nov. 5, 1912.

2 SHEETS—SHEET 1.

WITNESSES

INVENTOR
ALTON L. WYMAN
BY
ATTORNEYS

A. L. WYMAN.
CONNECTING ROD.
APPLICATION FILED DEC. 1, 1911.

1,043,495.

Patented Nov. 5, 1912.
2 SHEETS—SHEET 2.

WITNESSES

INVENTOR
ALTON L. WYMAN
BY
ATTORNEYS

UNITED STATES PATENT OFFICE.

ALTON L. WYMAN, OF MINNEAPOLIS, MINNESOTA, ASSIGNOR, BY MESNE ASSIGNMENTS, TO EMERSON-BRANTINGHAM COMPANY, OF ROCKFORD, ILLINOIS, A CORPORATION OF ILLINOIS.

CONNECTING-ROD.

1,043,495.      Specification of Letters Patent.      Patented Nov. 5, 1912.

Application filed December 1, 1911. Serial No. 663,368.

*To all whom it may concern:*

Be it known that I, ALTON L. WYMAN, of Minneapolis, Hennepin county, Minnesota, have invented certain new and useful Improvements in Connecting-Rods, of which the following is a specification.

The object of my invention is to provide improved means for attaching a connecting rod to a crank to the end that the attachment and later adjustment can be easily and quickly made and the parts when once adjusted and locked will be rigidly held against accidental loosening or separation.

A further object is to do away with all shims in the adjustment of the rod.

The invention consists generally in an adjusting device which is entirely independent of the locking device.

Further the invention consists in an adjusting device in which the take-up is lengthwise of the bearing.

Further the invention consists in providing a wedge take-up in which the bearing is on the width of the strap instead of the thickness of it, thus providing a much longer bearing surface.

Figure 1:
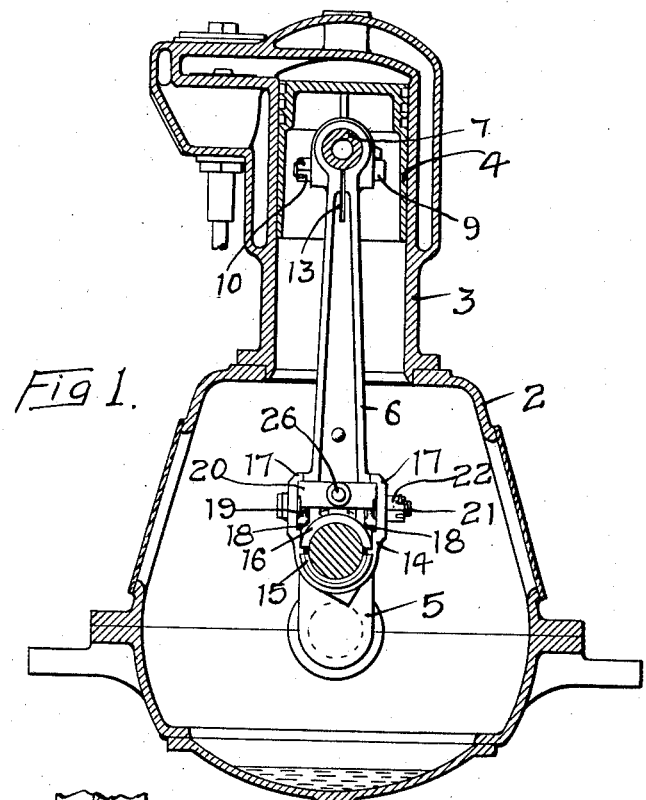
Figure 4:
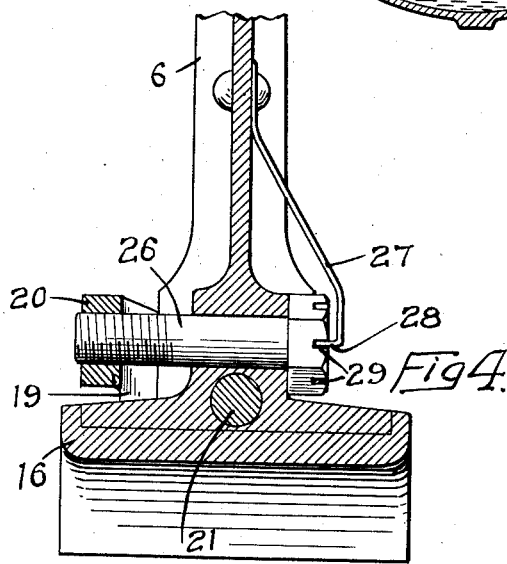
Figure 5:
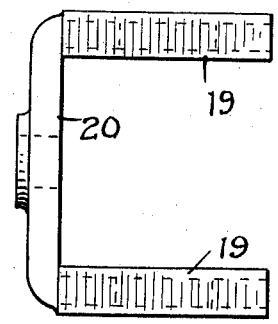
Figures 2, 3:
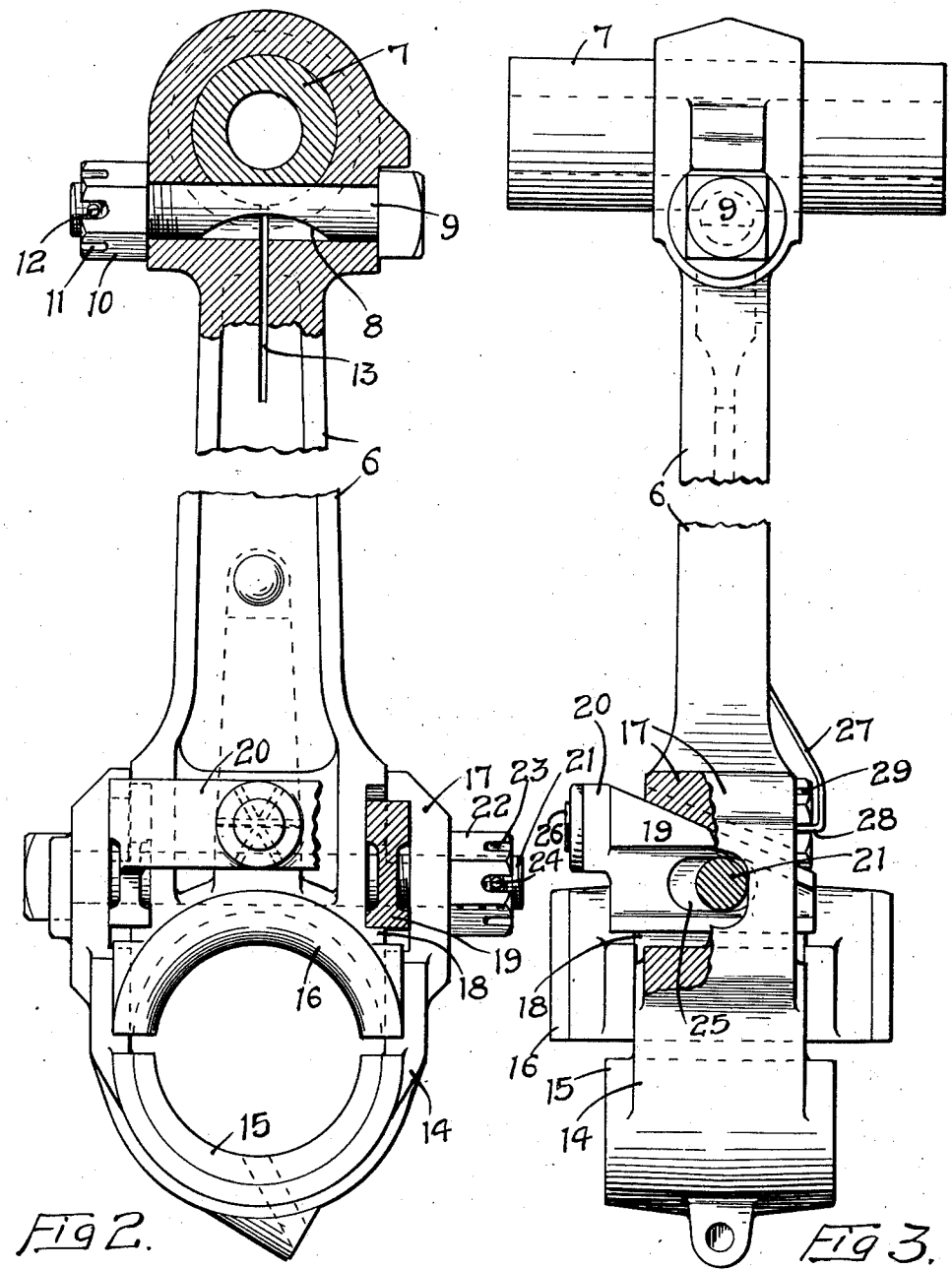

In the accompanying drawings forming part of this specification, Figure 1 is a sectional view of a crank case and cylinder, showing the application of my invention to a connecting rod and a crank shaft, Fig. 2 is a view, partially in section, showing the construction of the attachment between the rod and shaft, Fig. 3 is a similar view, taken on a line at right angles substantially to the view shown in Fig. 2, Fig. 4 is a detail sectional view illustrating the device for locking the clamping wedges, Fig. 5 is a detail view of the device on which the wedges are formed.

In the drawing, 2 represents a crank case, 3 a cylinder, and 4 a piston.

5 is a crank shaft and 6 a connecting rod. 7 is a pin mounted in the walls of the piston and provided with a recess on one side to allow the insertion of a locking bolt 9 having a recess 8 which permits the withdrawal of the pin 7 when the bolt 9 is rotated to bring the recess 8 opposite said pin. The bolt 9 passes through the piston end of the connecting rod and is provided with a lock nut 10 having notches 11 to receive a locking cotter-pin 12. The connecting rod is split at 13 to allow the bolt to clamp the rod securely on the pin. As shown in Fig. 1, it would be obviously impracticable to insert the bolt into its socket after the connecting rod has been put in place in the piston. I therefore insert this bolt into the rod and then thrust the rod into the piston and rotate the bolt until its recess is in position to receive the pin and allow longitudinal movement of the pin to connect the rod to the piston. A strap 14 passes around the crank and has a cap or semi-circular bearing plate 15 opposite a similar plate 16 that is carried by the end of the connecting rod, a sufficient space being provided between these bearing caps, as shown in Fig. 2, to allow for adjustment to the surface of the crank and take up the wear in the bearing. The strap is provided with hooked ends 17 and shoulders 18 are formed on the connecting rod and on these shoulders the flat faces of the wedge-shaped ends 19 of the plate 20 are seated, the inclined faces of the wedges engaging the hooked ends 17 of the strap and drawing the bearing plate 15 against the surface of the crank until the desired degree of adjustment is obtained. The ends of the strap are held in place by a bolt 21 passing therethrough and provided with a lock nut 22 having notches 23 to receive a cotter-pin 24, and said bolt passes through longitudinal slots 25 in the wedges, said slots being of sufficient length to allow the lengthwise adjustment of the wedges, but preventing their separation from the strap and bolt. The advantages of this connecting means lie in the fact that the adjustment will be uniform on both ends of the strap and the cap or bearing plate 16 will be seated evenly against the surface of the crank shaft. A further advantage in this adjusting device lies in the fact that it eliminates entirely the use of shims; the adjusting is entirely independent of the locking feature and the take-up is lengthwise of the bearing. A further advantage arises from the fact that the bearings of the wedges are across the strap or transversely thereof, instead of merely on the thickness of the strap. The wedges are adjustable preferably by means of a bolt 26 arranged transversely with respect to the bolt 21 and having a locking means to prevent accidental turning of the bolt, consisting of a spring 27 having an inwardly turned end 28 that is adapted to slip into notches 29 in the head of the bolt.

I claim as my invention:—

1. A bearing including movably connected members oppositely disposed, one of said members straddling the other member, said members having opposing faces formed thereon, wedges engaging said faces for drawing said members together, one of said members and said wedges having slotted openings therein, and a locking bolt passing through said slotted openings and through the other member for locking them together.

2. A bearing including separably movable members, one of said members straddling the other member, said members having opposing cam surfaces, a U-shaped plate having wedge-shaped ends to engage said cam surfaces, said wedge-shaped ends and one of said members having slotted openings therein, a locking bolt passing through said openings and said other member and an adjusting means for moving said plate and said wedge-shaped ends simultaneously.

3. A connecting rod having transverse bearing faces formed thereon near one end, a strap straddling the end of said rod and having bearing faces formed in its ends to register with the bearing faces of said rod, strap tightening means to engage said bearing faces and draw said strap toward said rod, and a locking bolt passing through the ends of said strap and said tightening means.

4. A connecting rod having a bearing at one end, a U-shaped strap having a bearing opposite that of said rod, the ends of said strap and said rod having transverse bearing faces therein, a U-shaped plate having wedge-shaped ends to engage said bearing faces, means for moving said plate to adjust said wedge-shaped ends simultaneously, and a bolt passing through openings provided in the ends of said strap and in said wedge-shaped ends, said openings allowing freedom of adjustment of said strap ends and said wedge-shaped ends.

5. A connecting rod having a bearing at one end, and transverse bearing faces contiguous thereto, a strap having a bearing at its middle portion opposite the bearing of said rod and having its ends provided with bearing faces contiguous to the corresponding faces of said rod, wedges contacting with said bearing faces, the ends of said strap and said wedges having openings therein, a bolt passing through said openings, and a locking bolt engaging said wedges and said rod for simultaneous adjustment of said wedges.

6. A connecting rod having transversely arranged bearing faces at one end, a strap straddling the end of said rod and having its ends contiguous to said bearing faces and provided with similar bearing faces, wedges arranged to engage said bearing faces and draw the middle portion of said strap toward the end of said rod, said strap ends and said wedges having longitudinal slots therein, a bolt fitting within said slots, and means for moving said wedges simultaneously to draw said strap and rod together.

7. A connecting rod having a bearing at one end, a strap having a bearing at its middle portion opposite the bearing of said rod, the ends of said strap straddling said rod, said strap ends and said rod having wedge seats formed thereon and inclined surfaces opposite said wedge seats, wedges engaging said seats and surfaces for drawing said strap toward said rod, and a bolt passing through said strap ends and wedges, said ends and said wedges having openings therein to receive said bolt and allowing freedom of endwise movement of said strap and wedges, substantially as described.

8. A connecting rod having transverse recesses formed therein at one end, the opposing walls of said recesses having bearing faces, one being straight and the other inclined, a strap straddling the end of said rod and also having transverse recesses therein and corresponding bearing faces, wedges having straight and inclined faces engaging the corresponding faces of said rod and said strap, said wedges and strap ends having slotted openings therein, a locking bolt passing through said openings and said rod, and means for adjusting said wedges to tighten said strap.

9. A connecting rod comprising a bearing head at the end thereof having plane faced outside walls, each terminating in a right angled shoulder, a movable bearing cap provided with straps overlying and engaging said faces, each of said straps being provided with a transverse slot across the inner face thereof, the end wall of said slot being oblique with respect to the wall of said shoulder, keys between said slot walls and said shoulders for holding the bearing cap in connection with the bearing head, and means to move the keys thereby to effect movement of the bearing cap.

10. A connecting rod comprising a bearing head at the end thereof having plane faced outside walls, each terminating in a right angled shoulder, a movable bearing cap provided with straps overlying and engaging said faces, each of said straps being provided with a transverse slot across the inner face thereof, the end wall of said slot being oblique with respect to the wall of said shoulder, keys between said slot walls and said shoulders for holding the bearing cap in connection with the bearing head, and means for moving the keys simultaneously thereby to effect movement of the bearing cap.

In witness whereof, I have hereunto set my hand this 28th day of November, 1911.

ALTON L. WYMAN.

Witnesses:
GENEVIEVE E. SORENSEN,
C. H. REHFUSS.

Copies of this patent may be obtained for five cents each, by addressing the "Commissioner of Patents, Washington, D. C."